US012673410B2

(12) United States Patent     (10) Patent No.:   US 12,673,410 B2

Doerflinger et al.     (45) Date of Patent:    Jul. 7, 2026

(54) TOOL STORAGE UNITS WITH INTEGRATED POWER

(71) Applicant: Snap-on Incorporated, Kenosha, WI (US)

(72) Inventors: David A. Doerflinger, Franksville, WI (US); Daniel Eggert, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 415 days.

(21) Appl. No.: 17/085,656

(22) Filed: Oct. 30, 2020

(65) Prior Publication Data

US 2021/0138628 A1     May 13, 2021

Related U.S. Application Data

(60) Provisional application No. 62/935,406, filed on Nov. 14, 2019, provisional application No. 62/934,330, filed on Nov. 12, 2019.

(51) Int. Cl.
| | |
|---|---|
| *B25H 3/02* | (2006.01) |
| *H01R 13/72* | (2006.01) |
| *H01R 25/00* | (2006.01) |
| *H02G 11/00* | (2006.01) |
| *H02G 11/02* | (2006.01) |

(52) U.S. Cl.
CPC ............. *B25H 3/028* (2013.01); *H01R 13/72* (2013.01); *H02G 11/006* (2013.01); *H02G 11/02* (2013.01); *H01R 25/003* (2013.01)

(58) Field of Classification Search
CPC ...... H01R 13/72; H01R 25/003; B25H 3/028; H02G 11/006; H02G 11/02

USPC ........................................................ 206/216
See application file for complete search history.

(56) References Cited

U.S. PATENT DOCUMENTS

| | | | |
|---|---|---|---|
| 6,086,390 A | 7/2000 | Haut | |
| 6,976,744 B2 * | 12/2005 | Hay ....................... | A47B 97/00 |
| | | | 312/249.13 |
| 8,084,992 B2 | 12/2011 | Scheffy et al. | |
| D843,321 S | 3/2019 | Dickey et al. | |
| 10,897,149 B2 * | 1/2021 | Byrne .................... | H01R 13/73 |
| 2006/0006838 A1 | 1/2006 | Clarke et al. | |

(Continued)

FOREIGN PATENT DOCUMENTS

| | | |
|---|---|---|
| CA | 2653476 A1 | 12/2007 |
| CA | 2598796 A1 | 2/2008 |

(Continued)

OTHER PUBLICATIONS

Examination Report No. 1 for corresponding Australian Application No. 2020264383 dated Jul. 15, 2021, 6 pages.

(Continued)

*Primary Examiner* — Orlando E Aviles
*Assistant Examiner* — Sanjidul Islam
(74) *Attorney, Agent, or Firm* — Taft, Stettinius & Hollister LLP

(57) ABSTRACT

The present invention broadly relates to a tool storage unit with an integrated power strip. In some embodiments, the power strip is movable with a compartment of the tool storage unit. In other embodiments, the power strip is stationary. The compartment is adapted to provide access to the power strip when the compartment is open.

11 Claims, 4 Drawing Sheets

(56) References Cited

U.S. PATENT DOCUMENTS

| | | | |
|---|---|---|---|
| 2006/0042175 A1* | 3/2006 | Crespi | H02G 11/006 52/111 |
| 2007/0274042 A1 | 11/2007 | Jackson et al. | |
| 2008/0169251 A1 | 7/2008 | Smith | |
| 2008/0230340 A1 | 9/2008 | Wehler et al. | |
| 2008/0278046 A1 | 11/2008 | Scheffy et al. | |
| 2011/0303792 A1 | 12/2011 | Blanchard et al. | |
| 2012/0031778 A1 | 2/2012 | Mask et al. | |
| 2015/0108832 A1* | 4/2015 | Dickey | H01R 24/22 307/18 |
| 2015/0372423 A1 | 12/2015 | Dickey | |
| 2017/0232607 A1 | 8/2017 | Michael et al. | |
| 2017/0250509 A1 | 8/2017 | Swanson et al. | |
| 2018/0241189 A1 | 8/2018 | Alger, Jr. | |
| 2018/0301849 A1 | 10/2018 | Dickey | |

FOREIGN PATENT DOCUMENTS

| | | | | |
|---|---|---|---|---|
| CA | 2720803 A1 | | 11/2009 | |
| CA | 2959323 A1 | | 8/2017 | |
| CA | 2990218 A1 | | 6/2018 | |
| CA | 3048584 A1 | | 8/2018 | |
| CN | 101454224 A | | 6/2009 | |
| CN | 102088883 A | | 6/2011 | |
| CN | 106030724 A | | 10/2016 | |
| CN | 206922196 U | | 1/2018 | |
| CN | 207968002 U | | 10/2018 | |
| CN | 209226334 U | | 8/2019 | |
| CN | 210779861 | * | 6/2020 | |
| CN | 210779861 U | | 6/2020 | |
| DE | 19906768 A1 | | 12/1999 | |
| DE | 202006015302 U1 | | 3/2007 | |
| DE | 102012010597 A1 | | 12/2013 | |
| JP | H10174623 A | | 6/1998 | |
| TW | M266148 | | 6/2005 | |
| WO | WO-2007139918 A2 * | | 12/2007 | B25H 3/028 |

OTHER PUBLICATIONS

Taiwan Office Action for corresponding Application No. 11120320300 dated Apr. 6, 2022, 11 pages.
United Kingdom Combined Search and Examination Report for corresponding UK Application No. GB2017825.7 dated Apr. 8, 2021, 8 pages.
United Kingdom Combined Search and Examination Report for corresponding UK Application No. GB2117229.1, dated Jan. 18, 2022, 8 pages.
Canadian Office Action for corresponding CA Application No. 3,098,721, dated Jan. 24, 2022, 5 pages.
Taiwan Office Action for corresponding Taiwan Application No. 109139287, dated Sep. 8, 2021, 14 pages.
Examination Report No. 2 for corresponding Application No. 2020264383 dated Jun. 30, 2022, 3 pages.
Examination Report No. 3 for corresponding Application No. 2020264383 dated Jul. 11, 2022, 3 pages.
Combined Search and Examination Report for corresponding Application No. GB2207496.7 dated Jul. 20, 2022, 6 pages.
Examination Report for corresponding Application No. GB2117229.1 dated Jul. 15, 2022, 3 pages.
Chinese Office Action for corresponding Application No. 2020112579006 dated Sep. 1, 2023, 13 pages.
Canadian Office Action for corresponding Application No. 3,159,714 dated Jul. 7, 2023, 8 pages.
Examination Report No. 1 for corresponding Application No. 2022204852 dated Aug. 10, 2023, 5 pages.
URL: https://www.youtube.com/watch?v=g5szkiDbw_o>, "Snap-on Power Drawer," Snap-on Tool Tips. Retrieved from Internet on Aug. 8, 2023, published on May 10, 2018, 1 page.
URL: https://www.youtube.com/watch?v=g5szkiDbw_o>, "Drawer Outlet Safety," retrieved from internet on Aug. 8, 2023, published on Aug. 9, 2017, 1 page.
Chinese Patent Office, Second Office Action issued in corresponding Application No. 2020112579006, dated Mar. 14, 2024, 10 pp.
United Kingdom Intellectual Property Office, Examination Report issued in corresponding Application No. GB2306461.1, dated Apr. 26, 2024, 3 pp.
Canadian Patent Office, Examination Report issued in corresponding Application No. 3,219,580, dated Mar. 6, 2025, 5 pp.
Australian Patent Office, Examination Report No. 1 issued in corresponding Application No. 2024201651, dated Apr. 16, 2025, 6 pp.
"Drawer Cords," URL: https://www.curlycords.com.au/curlycords/drawer-cords/, Accessed on Apr. 25, 2025.
Australian Patent Office, Examination Report No. 2 issued in corresponding Application No. 2024201651, dated Feb. 19, 2026, 4 pp.

* cited by examiner

TOOL STORAGE UNITS WITH INTEGRATED POWER

CROSS-REFERENCES TO RELATED APPLICATIONS

This application claims the benefit of U.S. Provisional Patent Application Ser. No. 62/934,330, filed Nov. 12, 2019, and U.S. Provisional Patent Application Ser. No. 62/935, 406, filed Nov. 14, 2019, the contents of which are incorporated herein by reference in their entirety.

TECHNICAL FIELD OF THE INVENTION

The present invention relates generally to tool storage units. More particularly, the present invention relates to a tool storage unit having integrated power supply capabilities.

BACKGROUND OF THE INVENTION

With the rapidly expanding market and use of cordless power tools (i.e., battery operated tools), cordless tools stored in storage units, for example storage cabinets, particularly batteries for such tools, after a previous day of use, can be at low power when removed for the next use. Typically, the tool or battery has to be recharged for a period of time before beginning the next use.

Charging units used to charge tools, or the tools and/or batteries requiring charging, could be left to charge outside the security of a locked storage unit, but this leaves the charging units, tools and/or batteries susceptible to theft, damage or misuse by others. This is an undesirable alternative for many users working with cordless power tools at unsecured work-sites. Therefore, it is desirable to have power supply capabilities, such as power outlets, accessible in one or more drawers of the tool storage unit, where the power tools and/or batteries can be plugged in when stored the drawers, or other accessories or implements can be plugged in to receive power while in the drawer.

However, with the repeated opening and closing of drawers in storage units, the cables that supply power to the power supply outlets disposed in the drawers must be protected from damage.

SUMMARY OF THE INVENTION

According to an embodiment, the present invention broadly includes a tool storage unit. The tool storage unit includes a compartment, e.g. a drawer or slide, that is movable between open and closed positions, power outlets or power strip disposed in the compartment and accessible when the drawer is opened, and a power cable extending from the power outlets and adapted to couple to an external power source, such as, for example, a wall outlet. In an embodiment, the compartment includes a cutout in a wall of the compartment to allow the compartment to move between open and closed positions without interfering with or otherwise damaging the power outlets. In an embodiment, the power outlets may be disposed in a power strip coupled to an inside portion of the compartment.

According to another embodiment, the present invention broadly includes a tool storage unit. The tool storage unit includes a compartment movable between open and closed positions, a power strip with power outlets accessible via the compartment when the compartment is in the open position, and a power cable extending from the power strip and adapted to couple to a power source. The power outlets can supply power to anything plugged in the power outlets regardless as to whether the compartment is disposed in the open or closed positions. A cord reel is also coupled to an interior surface of a wall of the tool storage unit, and the cord reel is adapted to allow an amount of the power cable to unwind when the compartment is moved to the open position from the closed position, and retract the power cable when the compartment is moved to the closed position from the opened position, thus minimizing possible damage or snagging to the power cable and space while the compartment is moved. A guide such as a wire may be used to support the power cable as the compartment is moved between the open and closed positions.

According to another embodiment, the present invention broadly includes a tool storage unit. The tool storage unit includes a compartment that is movable between open and closed positions, a power strip with power outlets accessible via the compartment when the compartment is in the open position, and a power cable extending from the power strip and adapted to couple to an external power source. The power cable includes a coiled or twisted portion, and the coiled portion is adapted to allow the power cable to uncoil when the compartment is moved towards the open position, and recoil the power cable when the compartment is moved to the closed position, thus minimizing possible damage to the power cable and space.

According to another embodiment, the present invention broadly includes a tool storage unit. The tool storage unit includes a compartment that is movable between open and closed positions, a power strip with power outlets accessible via the compartment when the compartment is in the open position, and a power cable extending from the power strip and adapted to couple to a power source. A telescoping support has an end coupled to an interior surface of a wall of the tool storage unit. The telescoping support is adapted to allow the power cable to extend when the compartment is moved to the open position, and retract the power cable when the compartment is moved to the closed position, thus minimizing possible damage to the power cable and space. The telescoping support may also be used with a coiled portion of the power cable.

According to another embodiment, the present invention broadly includes a tool storage unit. The tool storage unit includes a compartment that is movable between open and closed positions, a power strip with power outlets accessible via the compartment when the compartment is in the open position, an accordion style sleeve with an end coupled to an interior surface of a wall of the tool storage unit; and a power cable extending from the power strip and adapted to couple to a power source. The power cable is disposed within the accordion style sleeve, and the accordion style sleeve is adapted to allow the power cable to extend when the compartment is moved to the open position, and retract the power cable when the compartment is moved to the closed position, and further protect the power cable from possible damage.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

DETAILED DESCRIPTION OF THE EMBODIMENTS

Figure 1:
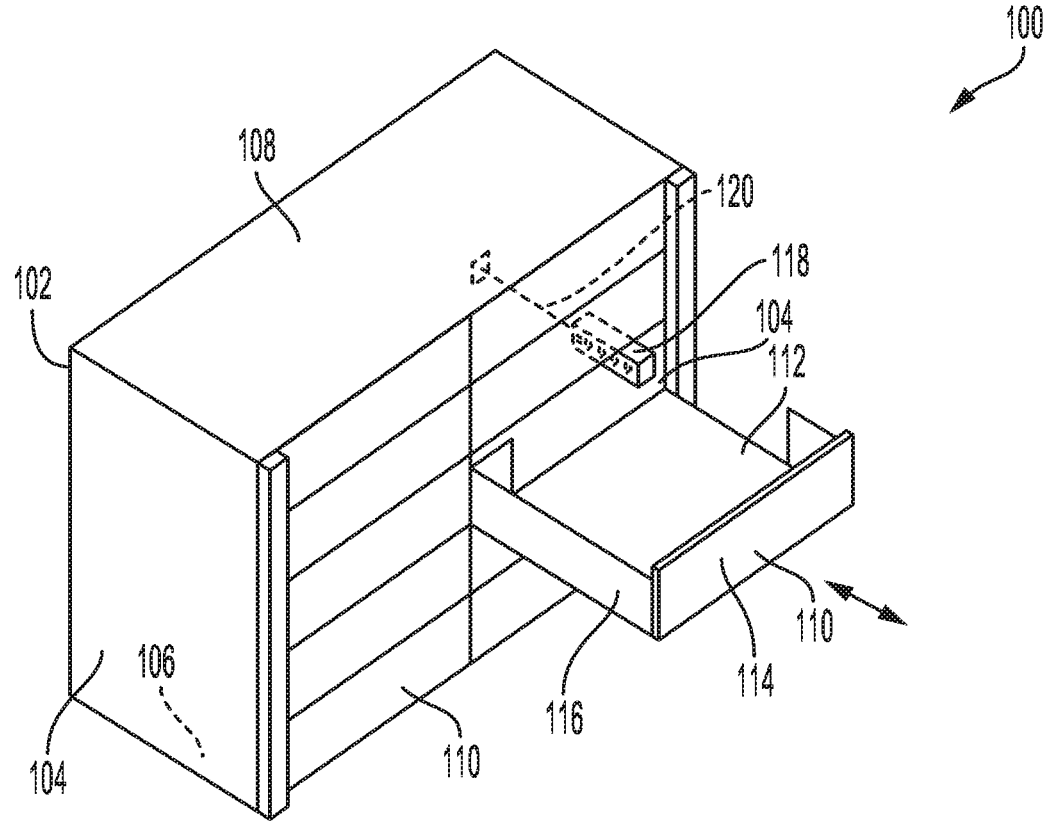
FIG. 1 is a perspective view of a tool storage unit according to an embodiment of the present invention.

While the present invention is susceptible of embodiments in many different forms, there is shown in the drawings, and will herein be described in detail, embodiments, including a preferred embodiment, of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly relates to a tool storage unit with power outlets. In some embodiments, the power outlets are movable with a compartment of the tool storage unit. In other embodiments, the power outs are stationary. The power outlets can be disposed in a one or more power strips. Moreover, it will be appreciated that any number of power outlets can be used, including, for example, one.

Referring to FIG. 1, a tool storage cabinet or unit (e.g., a roll cab) 100 includes a support frame 102, typically closed by wall sections 104 on three sides, a bottom wall 106, and a top wall or surface 108 which may be fixed or hinged for opening, leaving one side open for insertion of, for example, openable and closable compartments 110, such as drawers. The tool storage unit 100 may include a wheeled base attached at the bottom wall for portability, as well as side and rear add-on components, all of which are well-known features of such tool storage cabinets.

The compartment 110 may be a drawer that is adapted to move between open and closed conditions. The compartment 110 may be oriented horizontally or vertically. In this embodiment, the compartment 110 includes a bottom wall 112, front wall panel 114, and one or more back and sidewall panels 116. The front wall panel 114 may include a drawer pull and substantially seals or otherwise closes against the frame 102 of the storage unit 100 when the compartment 110 is closed.

A power strip 118 with power outlets may be coupled to an interior of the side wall 104 of the storage unit 100, and a power cord or cable 120 may extend from the power strip 118 out of the back wall of the storage unit 100 in order to couple to an external power source, such as, for example, a wall outlet, to provide power to the power strip 118. In this embodiment, the power strip 118 is fixed in position relative to the side wall 104. The compartment 110 includes a cutout in a side and/or back panel of the compartment 110 to allow the compartment 110 to open and close without interfering with the power strip 118 and to allow access. Alternatively, the compartment 110 may have a side and/or back panel removed to allow the compartment 110 to open and close without interfering with the power strip 118.

When the compartment 110 is opened, access to the power strip 118 is provided. However, when the compartment 110 is closed, access to the power strip 118 is prevented. This provides security for components plugged into the power strip 118.

The power cable 120 may be connected directly into a breaker box, for example, either on the storage unit 100 or by extending the cable 120 through the back wall of the storage unit 100 to a designated power source (not shown). Alternatively, an end of the power cable 120 may include a male plug for connecting to a cooperative outlet in the back wall or sidewall of the storage unit 100, which is operably coupled to an external power source. In an embodiment, additional cable could extend from the back wall of the storage unit 100 to allow it to be plugged into an external power source, such as a wall outlet (not shown) or generator (not shown). In another embodiment, the power cable 120 can pass through a hole in the back wall or sidewall of storage unit 100 to be directly connected to an external power source.

It will be appreciated that the power strip 118 may be coupled to any of the wall panels 104 to provide electrical power within the compartment 110. Several such power strips may be used, if necessary. Further, while commercial power strips are suitable, the outlet configuration (e.g., 1×6 strip, 2×3 strip, etc.) as well as the number of outlets provided, may vary for different intended uses.

As mentioned, in an embodiment, the storage unit 100 has walls 104 that block access to the interior of compartment 110 when the compartment 110 is in a closed position. However, the remaining space of the storage unit 100 may be configured in any manner known and used by those skilled in the art.

Figure 2:
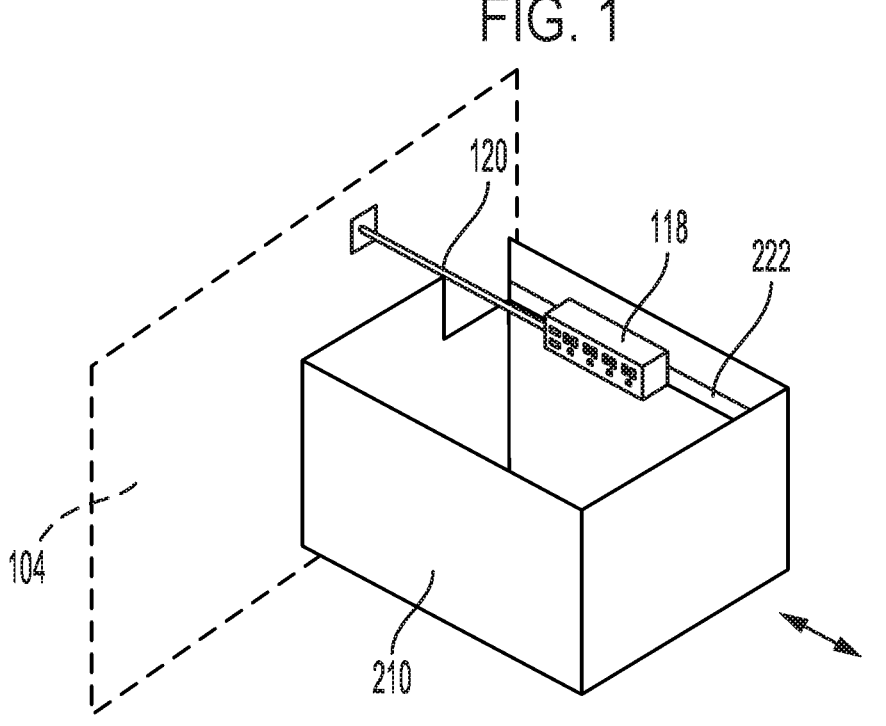
FIG. 2 is a component view of a compartment and power strip for a tool storage unit according to an embodiment of the present invention.

Referring to FIG. 2, in another embodiment, the power strip 118 may be coupled to a slidable connection 222 that is coupled to a side wall of the compartment 210. The compartment 210 may be substantially similar to the compartment 110, and includes a cutout in a back wall of the compartment 210 to allow the compartment 210 to open and close without interfering with the power strip 118. When the compartment 210 is opened, the slidable connection 222 allows the compartment 210 to slide open with respect to the power strip 118 while the power strip 118 remains stationary. Therefore, when opening or closing the compartment 210, the compartment 210 does not interfere with or otherwise damage power cable 120.

In a further embodiment of FIG. 2, the power strip 118 may be adapted to travel with the slidable connection 222 as the compartment 210 is opened/closed. The power strip 118 remains fixed on the slidable connection 222 while the slidable connection 222 moves with the compartment 210. When the compartment 210 is opened, the slidable connection 222 travels with the compartment, providing access to the power strip 118. When the compartment 210 is closed, the slidable connection 222 returns to a rest position. Throughout travel, the power strip 118 remains connected to the power cable 120. Therefore, when opening or closing the compartment 210, the power strip 118 remains fixed in place relative to the compartment 210.

Similar to the embodiment described with respect to FIG. 1, the cable 120 of FIG. 2, and/or additional cable could extend from the back wall 104 of the storage unit 100 to allow it to be plugged into an external power source, such as a wall outlet (not shown) or generator (not shown). In another embodiment, the power cable 120 can pass through a hole in the back wall or sidewall of storage unit 100 to be directly connected to an external power source.

Figure 3:
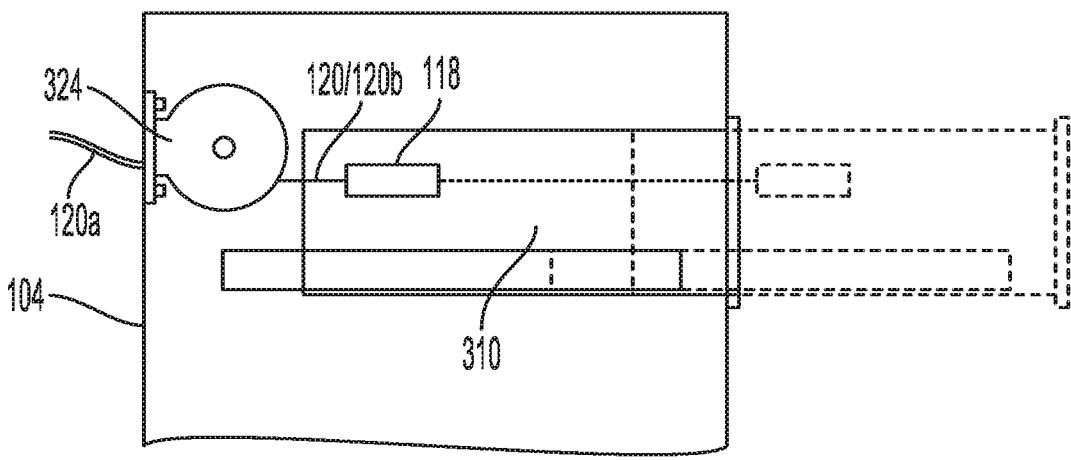
FIG. 3 is a section view of a tool storage unit according to an embodiment of the present invention.

Referring to FIG. 3, in another embodiment, the power strip 118 may be coupled to an interior side of a wall of a compartment 310, wherein it moves with the compartment 310 when the compartment is moved between the opened and closed positions. In this embodiment, a cord reel 324 may be coupled to an interior side of a wall 104 of the storage unit, and house a portion of the power cable 120. The cord reel 324 may be spring loaded or biased and is adapted to allow an amount of the power cable 120 to unwind as the compartment 310 is moved to the opened position, and automatically reels or retracts the power cable 120 as the compartment 310 is moved to the closed position. Therefore, when opening or closing the compartment 310, the compartment 310 does not interfere with or otherwise damage power cable 120.

The cord reel 324 may be disposed on the side or back wall 104 of the storage unit 100. The cord reel 324 may alternatively be coupled to a top wall 108. The cord reel 324 may be fixed in position relative to the storage unit 100 when opening or closing the compartment 310.

The cord reel 324 may be adapted to direct a fixed portion of power cable 120a through the back wall 104 of the storage unit 100 to allow it to be plugged into an external power source, such as a wall outlet (not shown) or generator (not shown). In another embodiment, the power cable 120 can pass through a hole in the back wall or sidewall of storage unit 100 to be directly connected to an external power source. In an example, the fixed portion of power cable 120a remains stationary while the compartment 310 is opened/closed to maintain a connection to the external power source. A second portion of the power cable 120b is adapted to couple to the power strip 118. As the compartment is opened, the second portion of the power cable 120b unwinds from the cord reel 324 to maintain the connection to the power strip 118.

When the compartment is closed, the cord reel 324 operates a spring or bias member (not shown) to reel or retract the second portion of the power cable 120b. A guide (such as described with regard to FIG. 5) may be operably coupled to the cord reel 324 to aid the cord reel in retracting the second portion of the power cable 120b onto the cord reel 324 to prevent tangles or jams. In an alternative embodiment of FIG. 3, the cord reel 324 may be coupled to the compartment 310 and move with the compartment 310 as it is opened and closed. In such an embodiment, the second portion of the power cable 120b couples to the external power source and the fixed portion of power cable 120a couples to the power strip 118.

Figure 4:
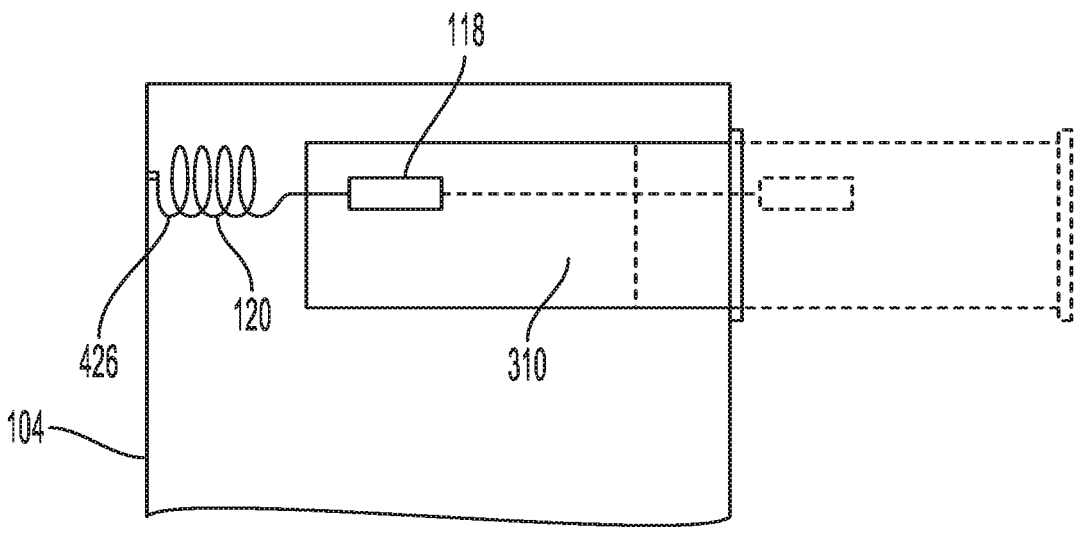
FIG. 4 is a section view of a tool storage unit according to another embodiment of the present invention.

Referring to FIG. 4, in another embodiment, an elastically coiled or twisted cable 426 may be used instead of the cord reel 324. In this embodiment, the coiled cable 426 may elastically allow an amount of the power cable 120 to extend as the compartment 310 is moved to the opened position, and then retract to the coiled shape as the compartment 310 is moved to the closed position. Therefore, when opening or closing the compartment 310, the compartment 310 does not interfere with or otherwise damage power cable 120. The power strip 118 may be fixed in position relative to the compartment 310 while the compartment 310 is opened/closed.

The coiled cable 426 may include a spring or specialized wrapping. The spring or specialized wrapping may be adapted to return the coiled cable 426 to a rest position in the coiled shape when the compartment 310 is moved to the closed position. For example, the spring may be wrapped around an exterior of the coiled cable 426. The spring may be adapted to recoil the coiled cable 426 to a rest position when the compartment 310 is closed. The specialized wrapping may be adapted to recoil the coiled cable 426 to a rest shape when the compartment 310 is closed. A support (such as described with regard to FIG. 5 or 6) may be disposed on the compartment 310 or the side wall 104 to assist the coiled cable 426 in retracting to the coiled shape.

As described above, the power cable 120 may also extend through the back wall 104 of the storage unit 100 to allow it to be plugged into an external power source, such as a wall outlet (not shown) or generator (not shown). In another embodiment, the power cable 120 can pass through a hole in the back wall or sidewall of storage unit 100 to be directly connected to an external power source.

Figure 5:
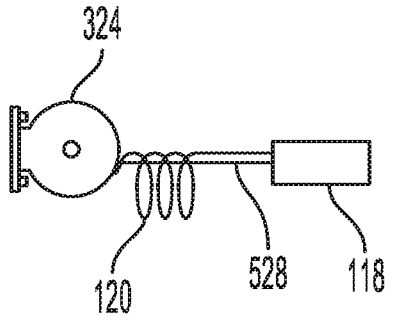
FIG. 5 is a component view of a power strip for a tool storage unit according to an embodiment of the present invention.

Referring to FIG. 5, in another embodiment, a wire or other support 528 may extend from the cord reel 324. The support 528 guides the power cable 120 as the compartment is moved between the opened and closed positions. As described above, the cord reel 324 allows an amount of the power cable 120 to unwind as the compartment is moved to the opened position, and automatically reels or retracts the power cable 120 as the compartment is closed. The support 528 may, for example, restrict the power cable 120 from dropping between the compartment and the side wall 104. The support 528 ensures the power cable 120 is reeled/retracted when the compartment is closed. Therefore, when opening or closing the compartment 310, the compartment 310 does not interfere with or otherwise damage power cable 120.

Figure 6:
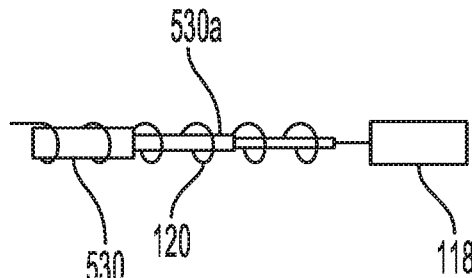
FIG. 6 is a component view of another power strip for a tool storage unit according to an embodiment of the present invention.

In another embodiment illustrated in FIG. 6, a telescopic tube 530 may be used instead of the cord reel 324. In this embodiment, the telescopic tube 530 may have one end coupled to a back wall 104 of the storage unit, and the other end coupled to the compartment, such as compartment 310 or other component. The telescopic tube 530 may extend and retract to allow an amount of the power cable 120 to extend as the compartment is opened, and automatically retake the coiled shape as the compartment is closed. The power cable 120 may be disposed around an exterior of the telescopic tube 530, or may be disposed in an interior of the telescopic tube 530. Further, it will be appreciated that the telescopic tube 530 may have a cross-sectional shape that is round, square, triangular, or any other shape. Therefore, when opening or closing the compartment 310, the compartment 310 does not interfere with or otherwise damage power cable 120.

The telescopic tube 530 may operate by extending at least one segmented portion 530a from within the telescopic tube 530 as the compartment is opened. As the compartment is closed, the at least one segmented portion 530a may be retracted within the telescopic tube 530. The telescopic tube 530 may be operably coupled to the compartment to couple the telescopic tube 530's extension/retraction with the compartment's movement.

The telescopic tube 530 may be used in connection with the coiled cable 436. The coiled cable 436 may be disposed on an exterior of the telescopic tube 530. The telescopic tube 530 acts as a guide to ensure the coiled cable 436 returns to its rest position when the compartment is closed.

The telescopic tube 530 may house the power cable 120 within an interior of the telescopic tube 530. As a result, the power cable 120 extends with the telescopic tube 530 as the compartment opens, and retracts with the telescopic tube 530 as the compartment closes.

The power cable 120, when the compartment is closed, may store a slack portion of the power cable 120 in the interior of the telescopic tube 530. The slack portion may be stored exterior to the storage unit 100. Alternatively, the slack portion may be stored in the interior of the storage unit 100, but external to the telescopic tube. Therefore, the power cable 120 is able to maintain a connection with the power strip 118 without damaging the power cable 120. As the telescopic tube 530 extends, the slack is taken out of the power cable 120 and the connection to the power strip 118 is maintained.

Figure 7:
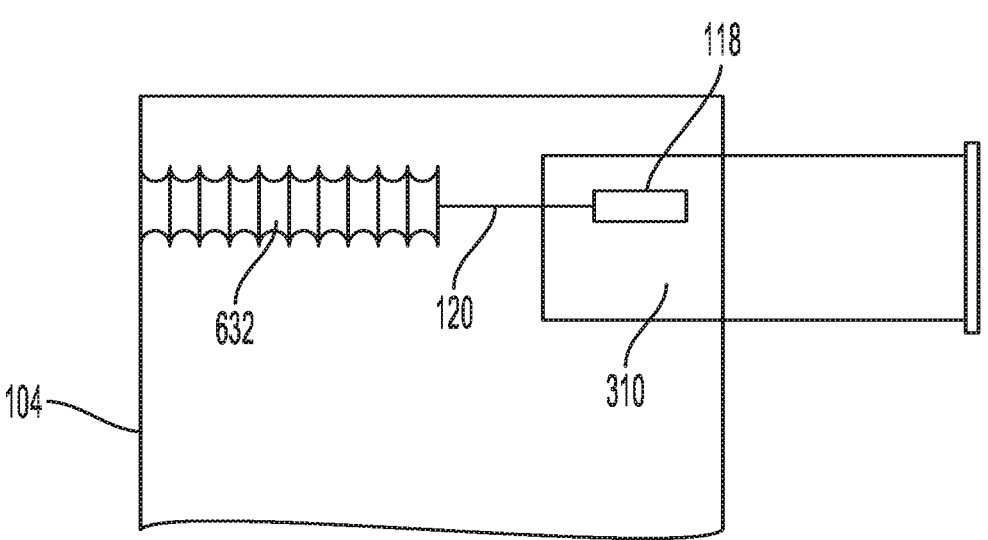
FIG. 7 is a section view of a tool storage unit according to another embodiment of the present invention.

Referring to FIG. 7, in another embodiment, the power strip 118 may be coupled to an interior side of a wall of a compartment 310. In this embodiment, an accordion style sleeve 632 may have an end coupled to an interior side of a wall 104 of the storage unit 100, and house and carry the power cable 120. The accordion style sleeve 632 may be spring loaded and protect the power cable 120. The accordion style sleeve 632 extends to allow an amount of the power cable 120 to extend as the compartment 310 is opened, and automatically retracts as the compartment 310 is closed. Therefore, when opening or closing the compartment 310, the compartment 310 does not interfere with or otherwise damage power cable 120.

As described above, the accordion style sleeve 632 may have one end coupled to a back wall 104 of the storage unit. The other end of the accordion style sleeve 632 may be coupled to the compartment, such as compartment 310 or other component. Thus, as the compartment 310 is opened, the accordion style sleeve 632 extends with the compartment 310.

In another embodiment, the power cable may be coupled to a wall of the storage unit, and a cable carrier may house the power cable and protect the power cable from damage. In this embodiment, the cable carrier may be coupled to the power cable, adjacent to where the power cable is coupled to the wall of the storage unit. Therefore, the power cable supports and indirectly couples the cable carrier to the wall of the storage unit. The cable carrier is adapted to house at least a portion of the power cable and extend to allow the power cable to extend as the compartment is opened, and fold on itself as the compartment is closed. Therefore, when opening or closing the compartment, the compartment does not interfere with or otherwise damage power cable, which is housed in the cable carrier.

Figure 8:
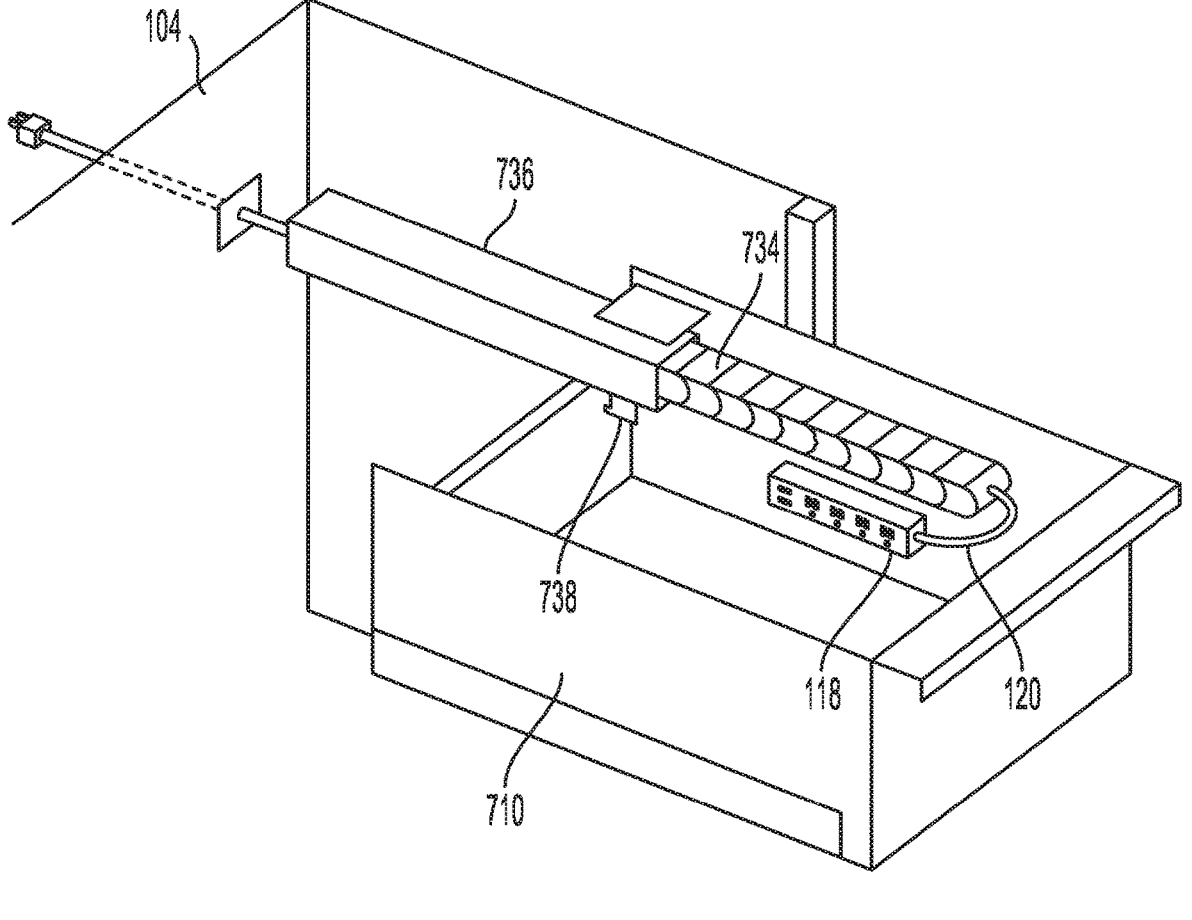
FIG. 8 is a view of a tool storage unit according to another embodiment of the present invention.

In another embodiment, referring to FIG. 8, the power strip 118 may be coupled to an interior side of a wall of a compartment 710. In this embodiment, a cable carrier 734 that is adapted to house at least a portion of the power cable 120 is included. A tube 736 is slideably coupled to the compartment 710 (and may extend thorough a cutout or aperture in a back wall of the compartment 710, or over a back wall of the compartment 710 having a shorter height), so that when the compartment 710 is opened the tube 736 remains substantially stationary relative to the storage unit. The cable carrier 734 may be disposed in the tube 736. Thus, the tube 736 supports the cable carrier 734, allowing the power cable 120 to run from the power strip 118 through the carrier 734, which is supported by the tube 736, out the back wall 104 of the storage unit. The tube 736 may be any shape (such as, round, oval, rectangular, etc. for example) or it could be an open channel ('C' or 'J' or shaped channel) and could be made of a variety of materials (such as steel, aluminum, plastic for example).

The cable carrier 734 may extend out of the tube 736 to allow the power cable 120 to extend as the compartment 710 is opened, and retract into the tube 736 or fold on itself as the compartment 710 is closed. The cable carrier 734 may unfold as the compartment is opened. Therefore, when opening or closing the compartment 710, the compartment 710 does not interfere with or otherwise damage power cable 120, which is housed in the cable carrier 734.

The tube 736 may also include a stop 738 to prevent the tube 736 from pulling out of the compartment 710 when the compartment 710 is opened. Alternatively, the tube 736 may not require the use of the separate cable carrier 734, when the tube 736 is provided with a means to prevent cable abrasion at the tube ends, such as a radius or a separate insert to protect the power cable 120.

A lock may be provided on the storage unit, such as storage unit 100, such that the compartments described herein may be locked in a closed position when desired. Alternatively, a lock (not shown) may be provided on the compartment itself to allow locking of the compartment separate from the locking of the storage unit. Each of the power strips described herein may be comprised of 110 VAC and/or 12 VDC to accommodate most power tools and charging units. A 220 VAC power outlet may be supplied in some circumstances. The power strip, if 110 VAC, has a power cable which extends from the power strip and can be plugged into, for example, a wall outlet or a gas generator.

It should also be appreciated that each of the embodiments described here can be combined in one or more storage units, and/or features of one embodiment can be incorporated into another.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool storage unit, comprising:
a compartment movable between open and closed positions;
a power strip coupled to an interior wall of the compartment and accessible via the compartment when the compartment is in the open position;
a power cable extending from the power strip;
a cable carrier adapted to house at least a portion of the power cable; and a tube adapted to slidably couple to the compartment, wherein the tube extends over or through a back wall of the compartment, and wherein the cable carrier is disposed in the tube and the cable carrier is adapted to extend out of the tube when the compartment is moved to the open position and retract into the tube when the compartment is moved to the closed position.

2. The tool storage unit of claim 1, wherein the tube includes a stop adapted to restrict the tube from pulling out of the compartment when the compartment is moved to the open position.

3. The tool storage unit of claim 2, wherein the stop is adapted to abut the back wall of the compartment to restrict the tube from pulling out of the compartment when the compartment is moved to the open position.

4. The tool storage unit of claim 1, wherein the compartment includes a cutout in the back wall of the compartment and the tube is adapted to extend through the cutout.

5. The tool storage unit of claim 1, wherein the cable carrier is adapted to fold to retract into the tube when the compartment is moved to the closed position, and unfold to extend out of the tube when the compartment is moved to the open position.

6. The tool storage unit of claim 1, wherein the power strip includes at least one power outlet.

7. The tool storage unit of claim 1, wherein the compartment includes a lock adapted to lock the compartment in the closed position.

8. The tool storage unit of claim 1, wherein the power strip includes a 110-120 V AC power outlet.

9. The tool storage unit of claim 1, wherein the power strip includes a 220-240 V AC power outlet.

10. The tool storage unit of claim 1, wherein the power strip includes a 12 V power outlet.

11. The tool storage unit of claim 1, wherein the tube is coupled to the tool storage unit, and when the compartment is moved to the open position, the tube remains stationary relative to the storage unit.

\* \* \* \* \*